March 19, 1929.  J. A. GRAY  1,705,971
HANDLE SOLDERING APPARATUS
Filed Nov. 7, 1925  2 Sheets-Sheet 1
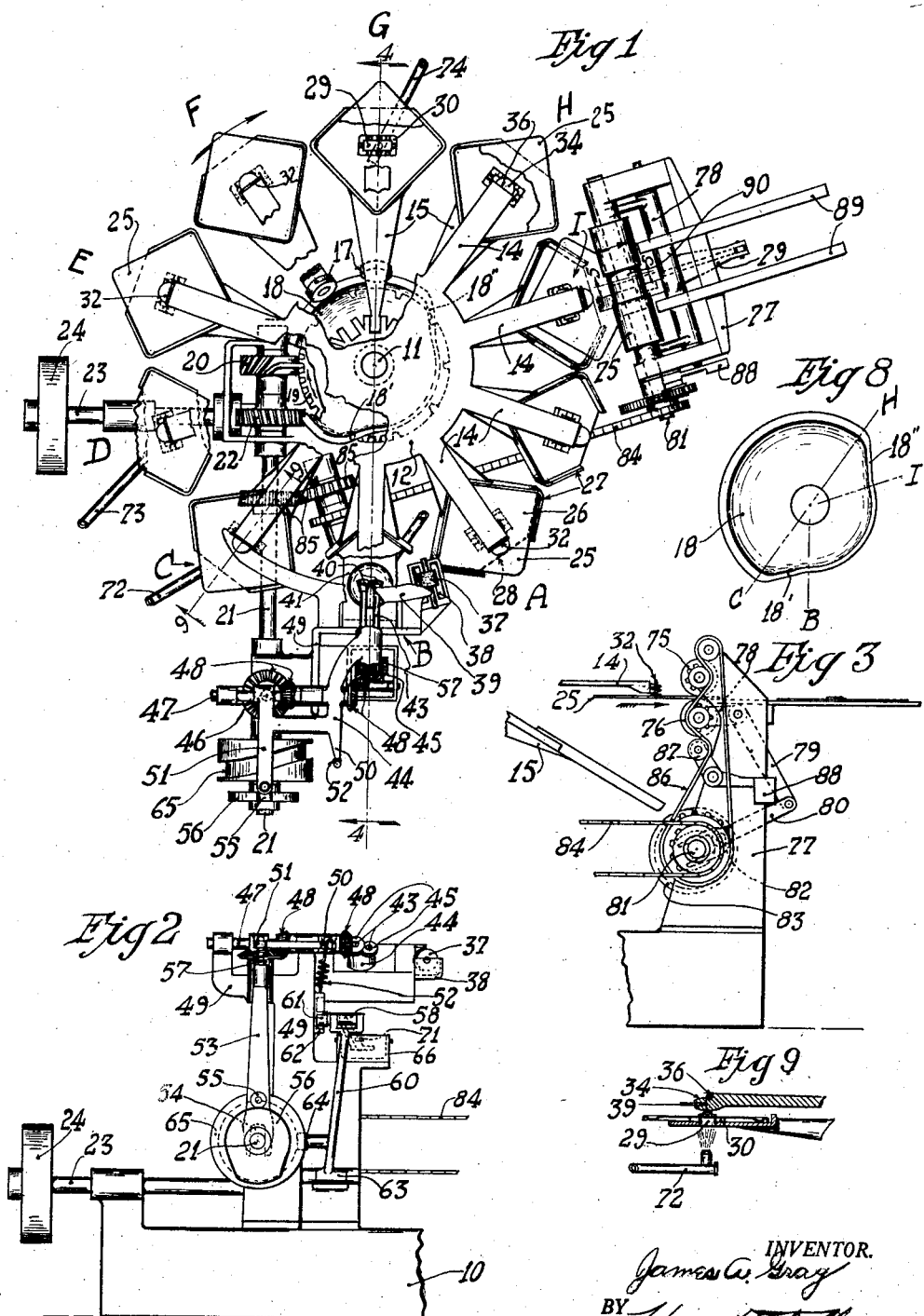
INVENTOR.
James A. Gray
BY Harry F. Totten
ATTORNEYS.

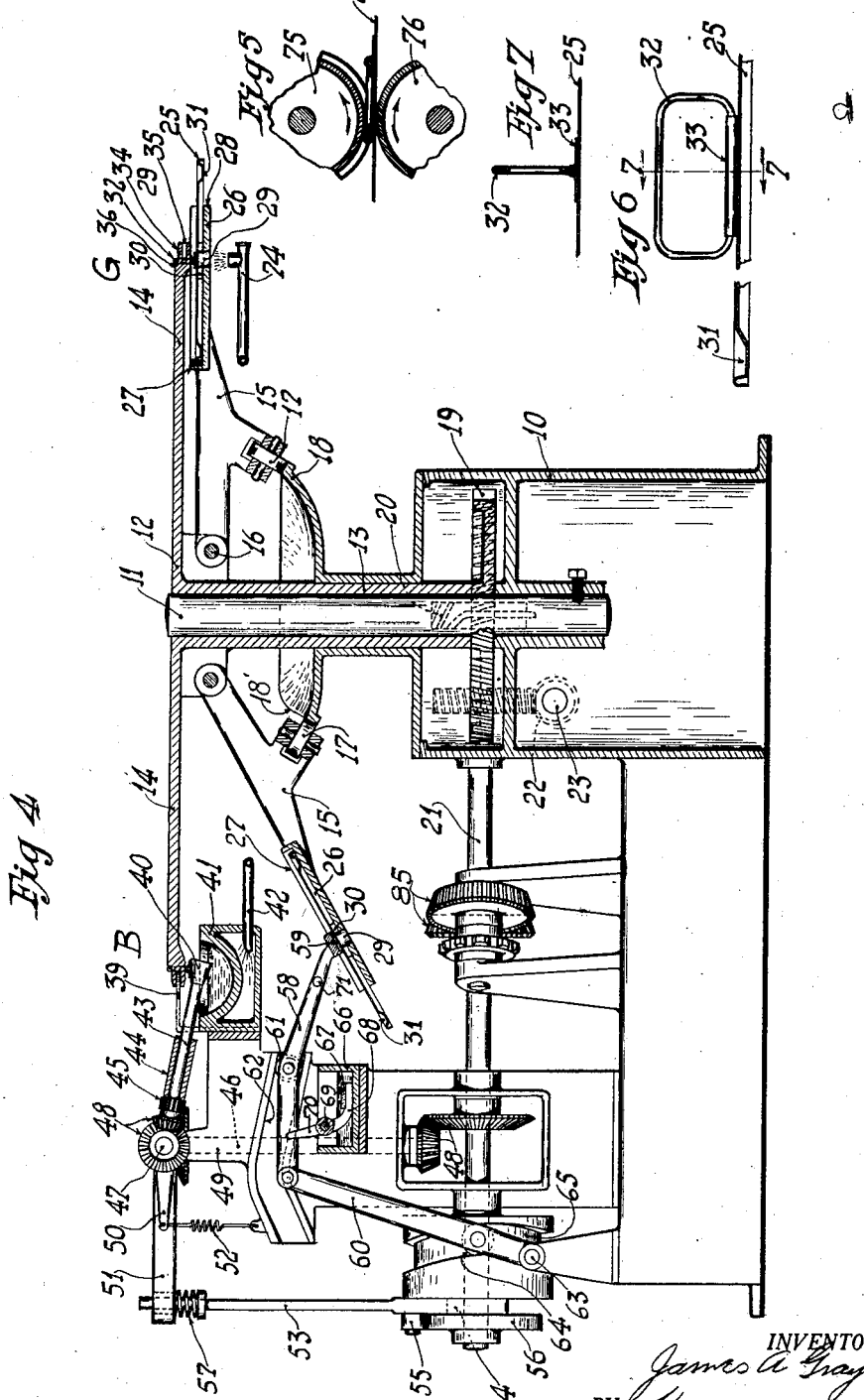

Patented Mar. 19, 1929.

UNITED STATES PATENT OFFICE.

1,705,971

JAMES A. GRAY, OF SAN FRANCISCO, CALIFORNIA, ASSIGNOR TO AMERICAN CAN COMPANY, OF SAN FRANCISCO, CALIFORNIA, A CORPORATION OF NEW JERSEY.

HANDLE-SOLDERING APPARATUS.

Application filed November 7, 1925. Serial No. 67,486.

The present invention relates to a machine for soldering handles to can ends.

It is customary to provide handles attached to the tops of certain classes of cans, and such handles are commonly of the folding type comprising an oval or rectangular loop or bail of wire secured to the can top by a cleat of sheet metal, the latter being soldered to the can top, and permitting the loop or bale to be folded down flat to facilitate stacking.

The invention as hereinafter described is embodied in a machine for soldering such handles to can ends or tops, but by an obvious and slight change in the arrangement of some of its parts, it may be adapted for soldering other types of handles. Similarly, the machine herein illustrated is adapted for soldering handles to the square tops of the common five-gallon cans, but by an obvious change in the shape of the top holders, it may be made to operate upon tops of any shape or size, or upon other objects of flat or plate-like form. It is to be understood, moreover, that other changes, within the scope of the claims hereto appended, may be made in the form, construction, and arrangement of the machine, without departing from the spirit of the invention as set forth in said claims.

Broadly speaking, the invention comprises a machine for applying acid or other so-called flux to both the can top and the handle cleat, applying a film of solder to the cleat, positioning the handle upon the top, applying heat to the assembled handle and top to fuse the solder film, cooling the joint so formed to harden the solder, and finally discharging the completed top from the machine in such a manner that the loop or bail of the handle is folded down flat to facilitate stacking of the tops.

The object of the invention is to provide a machine for accomplishing the above mentioned steps rapidly and effectively, with a minimum amount of hand labor, and without waste of solder.

In order fully to comprehend the invention, reference should be had to the accompanying drawings, wherein—

Fig. 1 is a plan view of the machine, certain parts being broken away for the sake of clearness.

Fig. 2 is an end elevation of the mechanism for applying the acid and solder.

Fig. 3 is a side elevation of the discharge and loop folding mechanism.

Fig. 4 is a vertical section taken in the direction of the arrows on the line 4—4 of Fig. 1 and enlarged.

Fig. 5 is a sectional detail of the loop folding and discharge mechanism, taken in the direction of the arrows on the line 5—5 of Fig. 1 and enlarged.

Fig. 6 is a transverse section of the completed can top showing the handle loop in elevation.

Fig. 7 is a section taken on the line 7—7 of Fig. 6.

Fig. 8 is a plan view of the stationary assembling cam.

Fig. 9 is a sectional detail of the fusing or sweating mechanism, taken in the direction of the arrows on the line 9—9 of Fig. 1.

In the drawings, the reference numeral 10 designates a base, from which rises a fixed vertical shaft 11. Upon said shaft is journaled a turret 12, having a central hub 13, a plurality of horizontal radially extending arms 14, and a corresponding number of radially disposed swinging arms 15, mounted upon pivots 16 and adapted to swing vertically toward and away from the upper fixed arms 14. Each swinging arm 15 is provided with a roller 17 and said rollers run upon a fixed cam 18, Figs. 1, 4 and 8, secured to the base 10, thereby causing the arms 15 to be successively raised and lowered as the turret revolves.

The rotation of the turret 12 is accomplished, intermittently, by inter-meshing mutilated gears 19 and 20, Figs. 1 and 4, the former secured to the hub 13 and the latter to a horizontal shaft 21. Said shaft is continuously driven by gearing 22, a second shaft 23, and a pulley 24 secured to said second shaft. The mutilated gears are so proportioned that the turret moves, at each step, a distance equal to the angular distance between its arms 14, so that said arms, and also the corresponding arms 15, are successively brought to and removed from the several stations at which operations occur, and are caused to rest at said stations long enough to permit the performance of such operations.

The first of such stations may be designated conveniently by the letter A, in Fig. 1, and is the position at which the can tops 25 are successively placed upon the swinging arms 15, by hand or by any suitable means not shown. Said arms are in their lowermost position, similar to that shown at the left of Fig. 4, so that the can tops may easily be placed upon them. For the purpose of receiving and holding a can top 25, each of said arms 15 is provided at its outer end with a holder portion 26 of suitable form, preferably having a raised flange or rim 27 of a size and shape to hold the top properly in position. The outer corner of the holder may be cut away, as shown at 28, to enable the convenient handling of the top. A central aperture 29, preferably of the approximate size and shape of the handle cleat, is formed in the holder 26, and said aperture is preferably surrounded by raised lugs 30, as shown in Fig. 4, to support the central portion of the top 25. Such lugs could, of course, be omitted if the top 25 were flat, instead of flanged as shown at 31.

At the position A the assembled handles are also placed successively upon the rigid arms 14, by hand or by any suitable means not shown, each handle comprising a wire loop or bail 32, and a sheet metal cleat 33 bent over one side of said loop in the usual manner, as shown in Figs. 6 and 7. For receiving and holding such handles, each arm 14 is provided at its outer end with a pair of fingers 34, separated by a horizontal slot 35, as shown in Fig. 4. Said fingers are of such size and shape as to fit comparatively closely within the loop 32, to prevent lateral or vertical movement thereof, and are backed by a shoulder 36 against which the loop is positioned. The cleat 33 lies horizontally below the fingers 34, as shown in Fig. 4.

The first movement of the turret 12 carries the arms 14 and 15 from the position A to the position B of Fig. 1 and during this movement the cleat 33 is passed over and in contact with a roller 37 mounted in an acid bath 38, Figs. 1 and 2, thereby applying the acid to the under side of the cleat. During this movement, also, the slot 35 between the fingers 34 of the arm 14 begins to travel upon a fixed arcuate guide rail 39, Figs. 1 and 4, which retains the loop 32 in its position against the shoulder 36.

At the position B, shown in Fig. 1 and at the left in Fig. 4, the cleat rests above a pair of suitably formed continuously rotating rollers 40 which operate in a bath 41 of molten solder.

A suitable heating means, as for example a burner indicated at 42, is provided to keep the solder bath 41 at the proper temperature. The rollers 40 are preferably tapered, as shown, and are respectively mounted upon parallel inclined shafts 43, journaled in a swinging bracket 44. Said shafts are connected together by spur gears 45, and are continuously rotated from the horizontal shaft 21 by a vertical shaft 46, a short horizontal shaft 47, and gearing designated collectively by 48 in Figs. 1, 2 and 4. The swinging bracket 44 is fulcrumed about the short horizontal shaft 47, which is journaled in a suitable fixed bracket or standard 49. Said swinging bracket 44 has two rearwardly extending arms 50 and 51 respectively, the former being connected with a spring 52 and the latter with a vertically disposed bar 53. Said bar at its lower end straddles the shaft 21, as shown at 54, in Figs. 2 and 4, and has a roller 55 adapted to follow a cam 56 secured upon said shaft 21. A cushioning spring 57 is interposed between the bar 53 and the arm 51 of the bracket 44.

The cam 56 is so formed and timed upon the shaft 21 that, when a handle cleat 33 comes to rest at the position B above the continuously rotating solder rollers 40, the bar 53 is lowered, thereby allowing the spring 52 to swing the bracket 44 to elevate said rollers 40 into contact with the under surface of the cleat, as shown in Fig. 4, and said rollers thereupon apply a thin film of solder to said cleat. The cam 56 then elevates the bar 53, depressing the rollers 40 into the bath of molten solder, enabling them to keep at the proper temperature until the next cleat is positioned above them by the next step movement of the turret 12, whereupon the operation is repeated.

At the position B the can top 25, which has not previously been acted upon, and which lies in the holder 26 as shown in Fig. 4, receives an application of acid at its central region. For this purpose there is provided a traveling arm 58 having at its outer end a suitable absorbent pad 59 adapted for contact with the top 25, as shown. The other end of said arm is pivotally connected with a lever 60, and it is provided at a suitable intermediate point with a roller 61 adapted to travel in a fixed track or groove 62. The lever 60 is fulcrumed at its lower end, at 63, and carries a roller 64 adapted to follow a grooved cam 65 secured upon the shaft 21. These various parts are so proportioned and timed that, as each can top 25 is brought to rest at the position B, the arm 58 advances to carry its pad 59 from an acid reservoir 66 to a position, as shown in Fig. 4, in contact with the central portion of the can top 25, and thereafter retreats to carry said pad back into the acid reservoir 66. In order to prevent splashing and dripping, the pad 59 is not dipped into the acid, but receives its charge thereof from a pad 67 mounted upon a short arm 68, said arm being fulcrumed at 69 and having a finger 70 adapted for engagement by a pin 71 projecting from the side of the traveling arm 58. Therefore, when said arm 58 reaches the rearward limit of its travel, the pin 71, engaging the finger 70 of the short arm 68, causes the pad 67 to be raised out of the acid bath into contact with the traveling arm pad 59, and when said traveling arm 58 again moves forwardly into contact with the can top, the pad 67 is allowed to drop back, by its own weight, into the acid.

The second step movement of the turret 12 carries the can top 25 and the handle 32—33 to the position C of Fig. 1, shown in section in Fig. 9, at which position the sweating or soldering operation is performed.

During this movement from B to C, the roller 17 of the swinging arm 15 rides on the upwardly inclined portion 18', Figs. 1, 4 and 8, of the stationary cam 18, thereby elevating said arm and the can top 25 from the position shown at the left of Fig. 4 to that shown in Fig. 9; i. e. the top 25 is raised to a horizontal position, and its central region, to which acid has been applied at the station B, is brought into firm contact with the under surface of the handle cleat 33, to which both acid and solder have been applied as described above. The handle is still held in its position upon the fingers 34 of the arm 14 by the arcuate guide rail 39.

During the period of rest at the position or station C, the central portion of the can top 25, and the handle cleat 33 in contact therewith, are heated by some suitable means to fuse the film of solder upon said cleat, thereby causing it to adhere to the upper surface of the top 25 as well as to the under surface of the cleat. For such heating there is shown a burner 72, Figs. 1 and 9, positioned beneath the aperture 29 in the top holder 26. If necessary to insure complete fusing of the solder film, a similar heating means, indicated by the burner pipe 73 in Fig. 1, may be located at the next station D, thereby causing the sweating or fusing operation to be carried on through two successive periods of rest of the turret.

At the next two stations E and F, no operations are performed, but at the station G the top holder 26 comes to rest with its aperture 29 above an air nozzle 74, Figs. 1 and 4, from which a jet of air is directed against the under side of the can top 25 to cool the solder film.

No action occurs at the next station H, Fig 1, thus giving additional time for the cooling and hardening of the solder.

Between the stations H and I, the top holder 26 is lowered by the downwardly inclined portion 18", Figs. 1 and 8 of the stationary cam 18, thus leaving the can top 25 suspended by its attached handle 32—33 from the arm 14, as shown in Fig. 3. As the station I is approached, the outer projecting corner of the top 25 passes between two normally separated horizontal rollers 75 and 76, the upper of which, 75, is mounted in a fixed standard 77, and the lower, 76, in a swinging bracket 78, Figs. 1 and 3, carried by said standard. Said bracket 78 has an arm 79, pivotally connected with a link 80, Fig. 3, which has a forked lower end straddling a horizontal shaft 81, and a roller 82 adapted to follow a grooved cam 83 secured upon said shaft. The shaft 81 is continuously driven by a chain 84 and gears 85, Fig. 1, from the shaft 21. A chain 86, Fig. 3, drives the rollers 75 and 76 continuously from the shaft 81. A chain tightener 87, actuated by a weight 88, may be provided to keep the chain 86 at the proper tension. The cam 83 is so formed and timed that it operates, through the link 80, the arm 79 and the swinging bracket 78, to raise the lower roller 76, as soon as the can top 25 comes to rest, thereby engaging said top between the two rollers 75 and 76. Said rollers, rotating continuously in opposite directions, immediately draw the top between them and discharge it upon suitable tracks 89, from which it may be removed in any desired manner, not shown.

The loop 32 of the handle slips freely off the fingers 34 of the arm 14, and if it remains in an upright position, as shown in Figs. 6 and 7, it is folded over flat, as shown in Fig. 5, by the action of the discharge rollers 75 and 76. The upper roller 75 is preferably formed with a shallow circumferential groove 90 in its central region, as shown in Fig. 1, to permit the handle 32 when folded to pass beneath it.

After leaving the discharge station I, Fig. 1, the turret moves, by two successive steps, again to the position A, where the cycle of operations described above begins again; and on account of the plurality of pairs of arms upon the turret, the same operations are performed in a plurality of cycles following each other by one step movement of said turret. Thus at each period of rest, a can top and a handle are placed upon their respective holders at the station A, and a top with the handle soldered thereto is removed at the station I.

I claim:—

1. In an apparatus for the described purpose, means for receiving and holding a can top, means above said receiving means for receiving and holding a handle with its cleat suspended therefrom over said can top, means for assembling said handle and said top together, and means for soldering said handle to said top while held in assembled relation.

2. In an apparatus for the described purpose, means for receiving and holding a can top, means opposite to the can top holding means for receiving and holding a handle with its cleat suspended therefrom, means for applying molten solder to said cleat, means for assembling together said handle and said cleat, and means for again fusing the solder upon said handle to cause it to adhere to said top.

3. In an apparatus for the described purpose, means for receiving and holding a can top, means for receiving and holding a handle, means for applying solder to the under side of said handle, means for positioning said handle upon said top with the solder between them, and means for fusing said solder.

4. In an apparatus for the described purpose, means for receiving and holding a can top, means for receiving and holding a handle, means for applying solder to the under side of said handle, means for positioning said handle upon the upper side of said top, and means for applying heat to the under side of said top to fuse said solder.

5. In an apparatus for the described purpose, mean for receiving and holding a can top, means for positioning a handle having a film of solder adhering thereto upon said top, and means for fusing said solder to unite the handle and the top.

6. In an apparatus for the described purpose, means for receiving and holding a can top, means for positioning a handle having a film of solder adhering thereto upon one side of said top, and means for applying heat to the other side of said top, to fuse said solder.

7. In an apparatus for the described purpose, means for receiving and holding a can top, means for positioning a handle thereupon, means for soldering said handle to said top, and means for cooling the soldered joint between said handle and said top.

8. In an apparatus for the described purpose, means for receiving and holding a can top, means for applying flux thereto, means for receiving and holding a handle spaced away from said top, means for applying flux to said handle, means for applying solder to said handle, means for positioning said handle upon said top, and means for fusing said solder to unite said handle and said top.

9. In an apparatus for the described purpose, means for receiving and holding a can top, means for receiving and holding a handle spaced away from said top, means for applying flux to said handle, means for causing said top and handle to contact with each other and means for soldering said handle to said top.

10. In an apparatus for the described purpose, means for receiving and holding a can top, means for receiving and holding a handle spaced away from said top, means for applying flux and solder to said handle, means for positioning said handle upon said top, and means for fusing said solder to unite said handle and said top.

11. An automatic soldering machine comprising means for receiving and holding spaced apart two separate members, means for applying solder to one of said members, means for assembling said members, and means for fusing said solder to unite said members.

12. An automatic soldering machine comprising means for receiving and holding spaced apart two separate members, means for applying flux and solder to one of said members, means for assembling said members, and means for fusing said solder to unite said members.

13. A soldering machine comprising means for receiving and holding a can top, means for receiving and holding a foldable handle, means for soldering said handle to said top, and a pair of rollers adapted to grip said top to remove it from the machine and to fold said handle flat thereupon.

14. A soldering machine comprising a rotating turret, spaced-apart means carried thereby for receiving and supporting respectively a plurality of can tops and handles, means for successively bringing together said spaced-apart means and soldering said handles to said tops, and means for successively removing the tops and handles from said turret.

15. An automatic soldering machine comprising a pair of arms for receiving and holding respectively a can top and a handle, means for moving one of said arms toward the other to assemble said top and handle, means for soldering together the assembled top and handle, and means for moving both said arms to carry the top and handle to and from the soldering means.

16. A soldering machine comprising a turret, a plurality of pairs of arms extending radially therefrom, each pair being adapted to receive and hold respectively a can top and a handle, means for moving one arm of each pair toward the other to assemble the top and handle held thereby, means for soldering the assembled top and handle, and means for rotating said turret to carry said pairs of arms successively to and from the soldering means.

17. An automatic soldering machine comprising means for receiving and holding two separate members, means for applying solder to one of said members, means for moving into contact and assembling said members, means for heating said applied solder and soldering said members together, and mechanism for moving said holding means to carry said members to and from said solder applying means, said assembling means, and said soldering means.

18. In a soldering machine, a reservoir adapted to contain molten solder, means for positioning an article to be soldered above said reservoir including an upper support for said article and a lower support for the part to which it is to be applied, one of said supports being movable toward the other to bring said article and part together, and means for removing solder from said reservoir and applying it to said article.

19. In a soldering machine, a reservoir adapted to contain molten solder, means for positioning an article to be soldered above said reservoir, a roller adapted to dip into the solder in said reservoir, and means for moving said roller bodily to cause it to contact with and apply solder to said article.

20. In a soldering machine, a reservoir adapted to contain molten solder, means for positioning an article to be soldered above said reservoir, a roller adapted to dip into the solder in said reservoir, a swinging bracket in which said roller is mounted, and means for swinging said bracket to move said roller into contact with said article.

21. In a soldering machine, a carrier having means for holding a can top and a handle spaced apart from each other, a solder bath past which said articles are carried, means for applying solder to one of said articles, devices for moving one of said articles into contact with the other, and means for reheating said applied solder to unite said can top and handle.

22. The combination of a rotary carrier having an upper series of holders for handles with their cleats suspended therefrom, and having a lower series of holders for can tops, means for rotating said carrier, means for applying solder to the under side of said cleats, means for moving the holders of one of said series to apply said cleats to the can tops, and heating means for melting said solder while the cleat is so applied.

23. The combination of an intermittently rotating carrier having an upper series of holders for handles with their cleats suspended therefrom, and having a lower series of holders for can tops, one of said series of holders being movable relative to the corresponding holders of the other series, means for rotating said carrier, means for applying solder to the under side of said cleats, means for moving the holders of one of said series to apply said cleats to the can tops, and heating means for melting said solder while the cleat is so applied.

24. The combination of an intermittently rotating carrier having an upper series of holders for handles, and having a lower series of holders for can tops, a series of stations past which said series of holders are carried by the said movement of the carrier, flux applying means at one of said stations, solder applying means at a subsequent station, means for actuating the movable holders at a subsequent station to bring together said cleats and can tops, heating means for melting the applied solder at said period of contact, and means at a subsequent station for discharging the can tops and handles applied thereto.

In testimony whereof I have signed my name to this specification.

JAMES A. GRAY.